(No Model.)
E. J. JERZMANOWSKI.
Process of Producing Hydrogen.
No. 233,861. Patented Nov. 2, 1880.
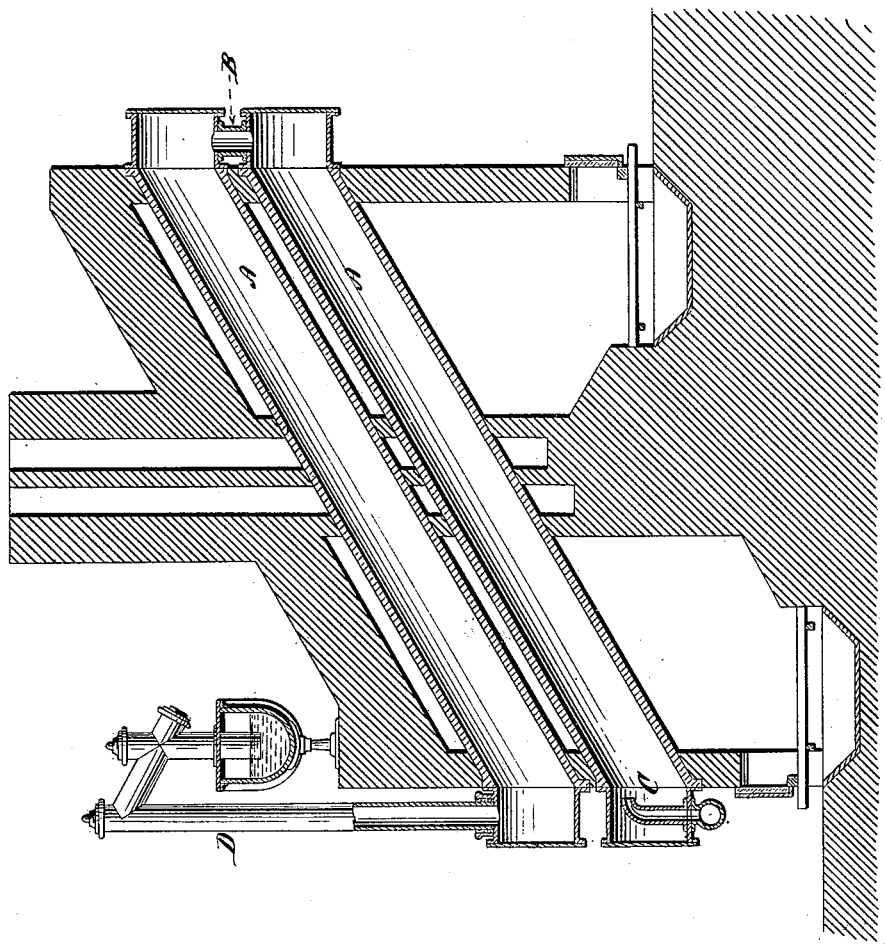
Witnesses:
Geo. W. Miatt
S. J. Sullivan
Inventor:
Erazm J. Jerzmanowski,
By his attorney,
E. N. Dickerson Jr.

UNITED STATES PATENT OFFICE.

ERAZM J. JERZMANOWSKI, OF NEW YORK, N. Y.

PROCESS OF PRODUCING HYDROGEN.

SPECIFICATION forming part of Letters Patent No. 233,861, dated November 2, 1880.

Application filed May 28, 1880. (No model.)

*To all whom it may concern:*

Be it known that I, E. J. JERZMANOWSKI, of the city, county, and State of New York, have invented a new and useful Process of Producing Hydrogen, of which the following is a full, true, and exact description, reference being had to the accompanying drawing.

My invention relates to a method of converting superheated steam or superheated steam containing hydrocarbons into hydrogen, or, indeed, almost any gas containing or capable of yielding hydrogen and carbonic oxide may be converted by this process.

The drawing is a sectional elevation, representing a double retort; but the retort could be arranged in many ways.

A A is the retort referred to, connected by pipe B. C is the nozzle admitting the gas to be converted, and D is the pipe which conveys the hydrogen gas to the hydraulic main, from which it is distributed as desired.

All gases or vapors which contain a mixture of hydrogen and carbonic oxide, or which can be transformed so as to contain those gases—as, for instance, coal-gas, cannel-gas, water-gas, gas made from oil, wood, or rosin, steam saturated with hydrocarbon vapors, &c.—can be decomposed to secure pure hydrogen by the following method:

Either aluminate of potassium, ($Al_2O_3Ka_2O$,) aluminate of sodium, ($Al_2O_3Na_2O$,) aluminate of calcium, ($Al_2O_3CaO$,) or aluminate of magnesium, ($Al_2O_3MgO$,) or some or all of them mixed, are pulverized, and then mixed and kneaded with water so as to form a paste. If not sufficiently plastic, a little clay or magnesia is mixed with it till it holds well together, and after some pulverized graphite, coal, coke, charcoal, sawdust, or finely-cut straw has been added to it to insure its porousness when baked, it is molded and pressed in forms as desired, such as spheres, cubes, bricks, or any other desired shape, and baked in an oven. Care should be taken that the pieces are not glazed. Although the proportions are generally not material, five per cent. of clay and eight to ten per cent. of graphite, &c., may be combined with about eighty-five per cent. of the alkaline aluminate. Ovens or retorts, as shown in the drawing, are filled with these blocks. These ovens or retorts can be heated either internally or externally, as desired, and the temperature should be maintained at about a cherry-red heat. At that temperature, and in the presence of either aluminate of potassium, aluminate of sodium, aluminate of calcium, or aluminate of magnesium, or of a mixture of some or all of them, superheated steam transforms carbonic oxide to carbonic acid and sets its own hydrogen free. The carbonic acid unites with the base or bases, and is again immediately freed from them by the acid action of the alumina ($Al_2O_3$) in the presence of an excess of steam, thereby maintaining a continuous process without the necessity of separate independent operations to restore the decomposing body to a condition to be again operative. Where water-gas and superheated steam are introduced this is the only chemical action which takes place; but where either superheated steam saturated with or containing hydrocarbon vapors, or steam mixed with coal-gas, wood-gas, rosin-gas, or oil-gas, or a mixture of some or all of these, either with or without the addition of water-gas, is introduced the chemical action is more complicated. In that case the heat of the blocks is first the cause of a decomposition of the hydrocarbon gases or vapors introduced. The carbon contained in them, uniting with the oxygen of the superheated steam, forms first carbonic oxide and then carbonic acid, which latter unites, as in the case of the decomposition of water-gas, with the base or bases of the alumina or aluminates, and is then detached from it and driven off by the acid action of the alumina. The result in all cases is a constant and continuous production of pure hydrogen and carbonic acid.

The hydrogen can be changed into illuminating-gas by any of the well-known methods, and then purified of the carbonic acid, or first purified and then changed into illuminating-gas.

What I claim as my invention, and desire to secure by Letters Patent, is—

1. The process herein described of producing hydrogen continuously, which consists in subjecting a gas or gases capable of yielding hydrogen and carbonic oxide to the action of heated blocks containing aluminate of potassium or its equivalent, substantially as described.

2. The method of producing hydrogen herein described, which consists in passing a gas capable of yielding hydrogen and carbonic oxide over heated blocks containing aluminate of potassium, or aluminate of sodium, or aluminate of calcium, or aluminate of magnesium, or a mixture of them.

3. The process of producing hydrogen herein described, which consists in passing a current of water-gas and superheated steam over highly-heated blocks or bodies containing aluminate of potassium, or aluminate of sodium, or aluminate of calcium, or aluminate of magnesium, or a mixture of them.

ERAZM J. JERZMANOWSKI.

Witnesses:
S. F. SULLIVAN,
WM. A. POLLOCK.